May 6, 1941.  M. STUCATUR  2,241,334
AUTOMATIC TRANSMISSION
Filed March 14, 1938  3 Sheets-Sheet 1
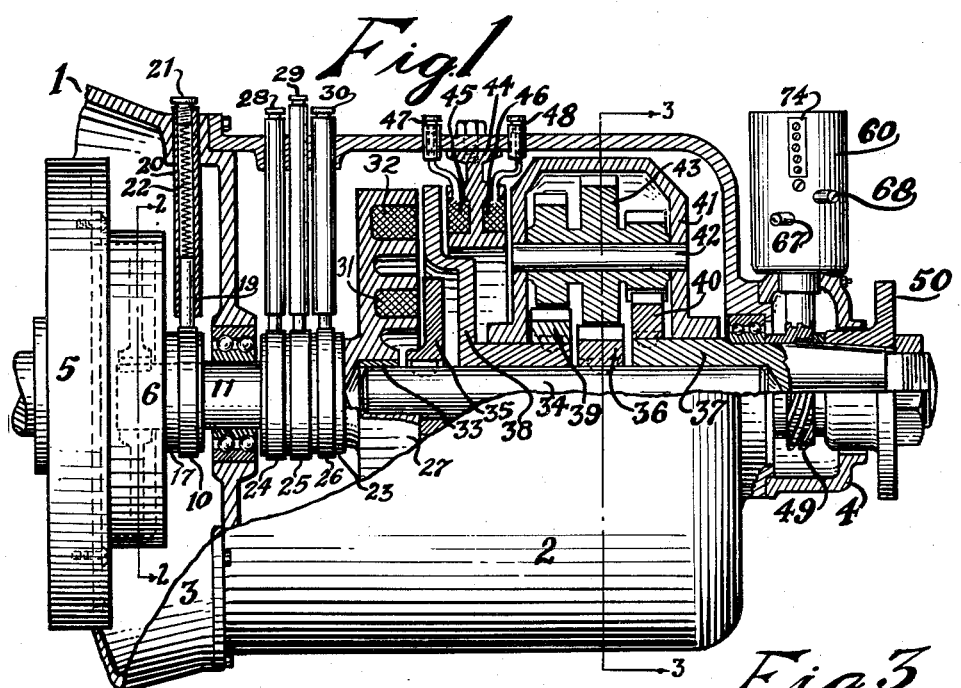
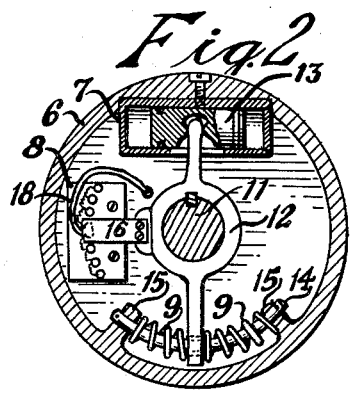
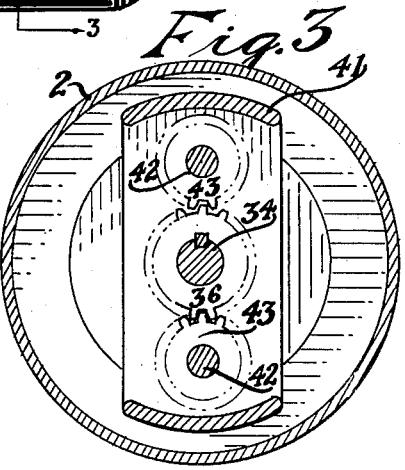
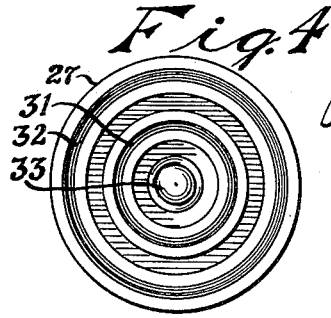
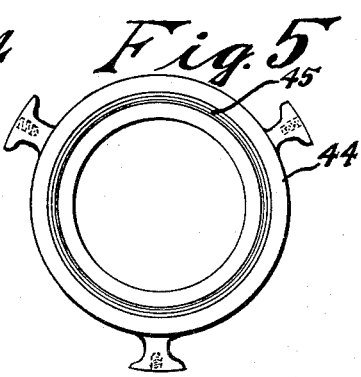
INVENTOR.
Matthew Stucatur

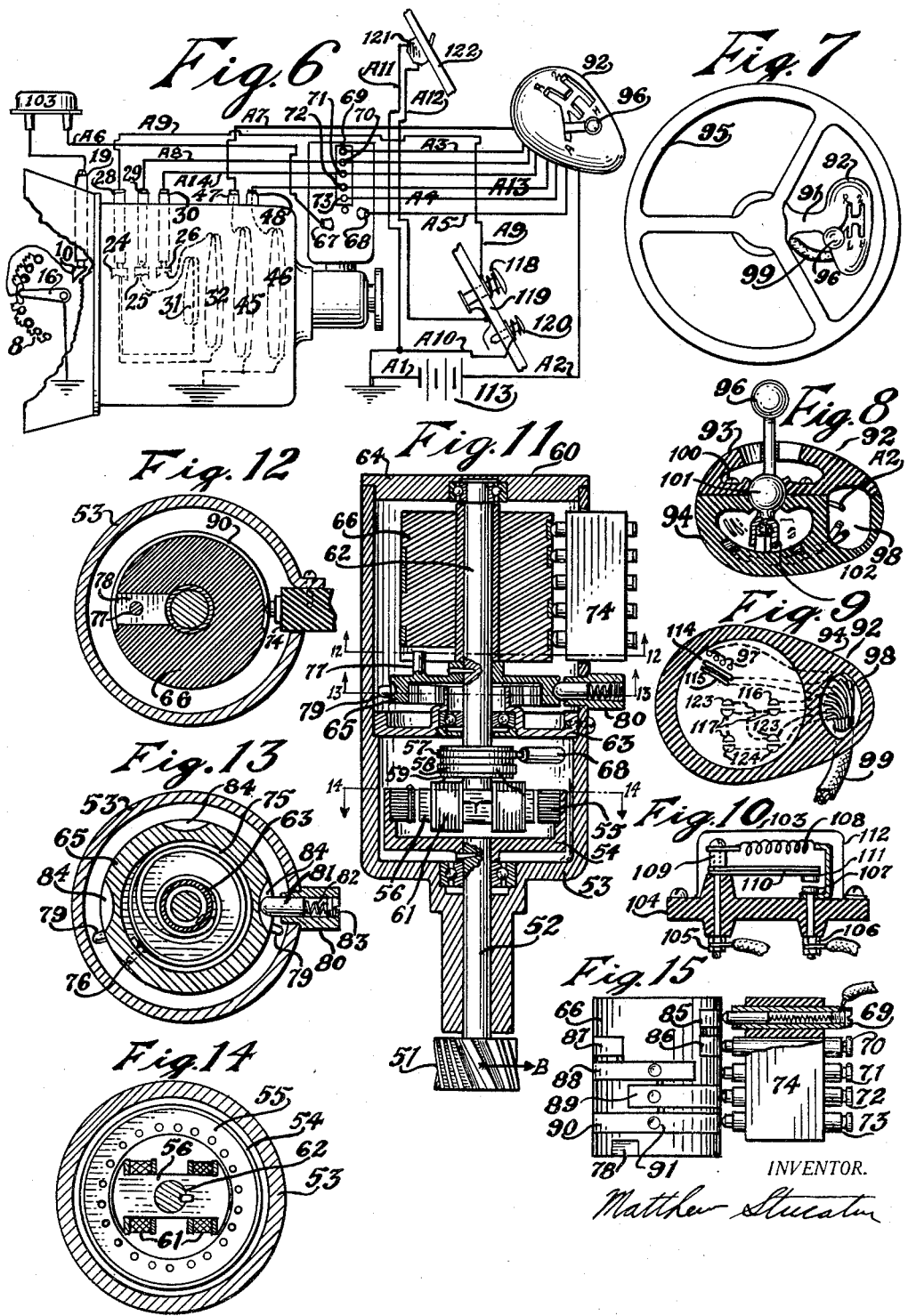

May 6, 1941.  M. STUCATUR  2,241,334
AUTOMATIC TRANSMISSION
Filed March 14, 1938  3 Sheets-Sheet 3
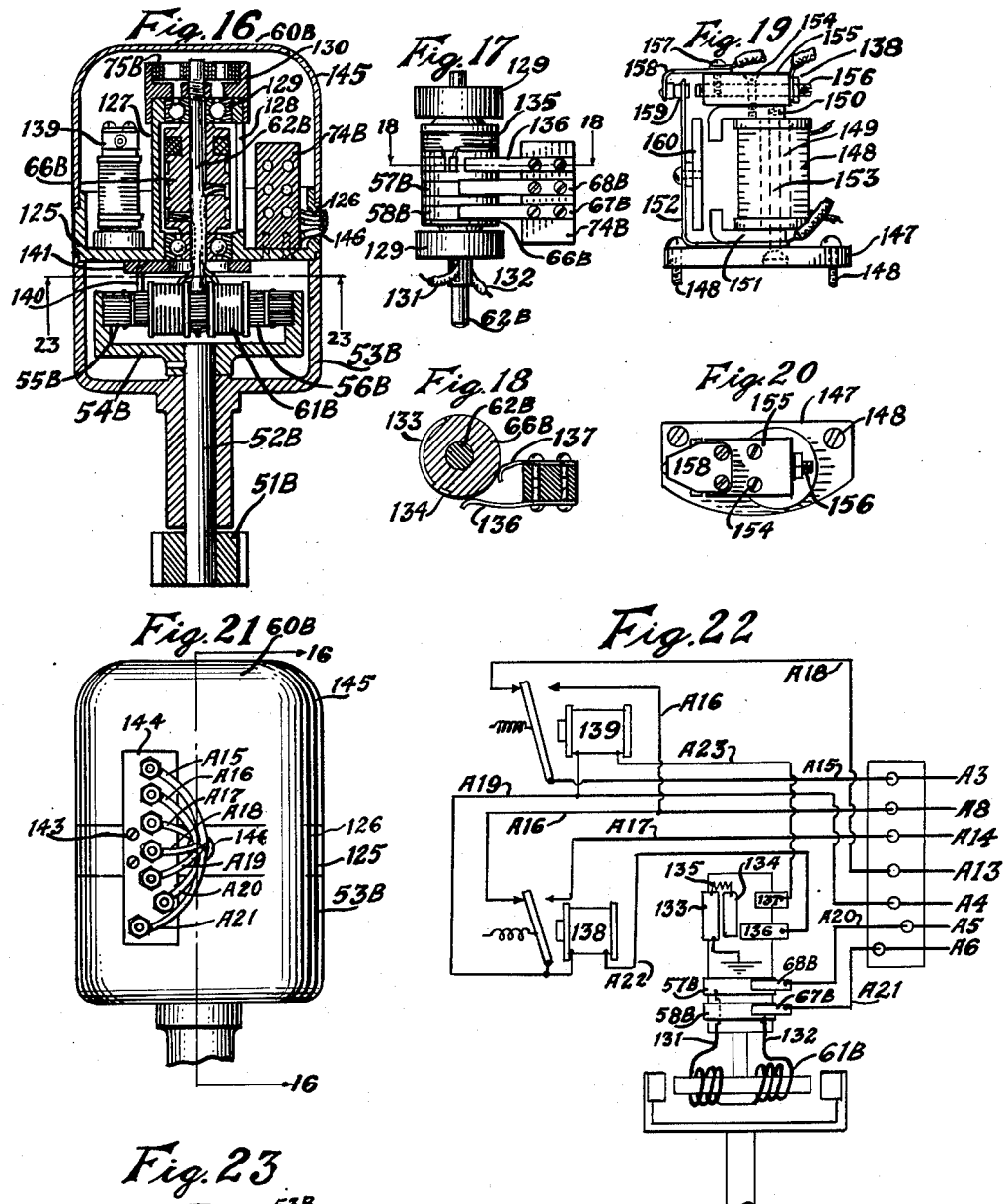
INVENTOR.
Matthew Stucatur Patented May 6, 1941

2,241,334

UNITED STATES PATENT OFFICE 2,241,334

AUTOMATIC TRANSMISSION

Matthew Stucatur, Philadelphia, Pa.; Fannie E. Stucatur, administratrix of said Matthew Stucatur, deceased, assignor to Fannie E. Stucatur Application March 14, 1938, Serial No. 195,811

12 Claims. (Cl. 74—260)

This invention has for its purpose a mechanism for effectively automatically connecting a prime mover with a varying load.

It also comprehends mechanism for automatically selecting an appropriate gear ratio suitable for both speed and torque conditions.

It also comprehends mechanism for automatically selecting a gear ratio suitable for utilizing the prime mover as a brake.

It also comprehends means whereby the operator can modify the automatic selection of gear ratios.

It also comprehends means whereby the operator can disconnect the automatic controls and manually select the gear ratios through the intermediary of power operated controlling mechanism.

It also comprehends means whereby the operator can control the speed changing by means of a lever operating in the same manner and restricted to the same motions as the "standard" gear shift lever now used on most automobiles.

It also comprehends a clutch neutralization pedal giving the same results and manually operated in the same manner as the "standard" clutch pedal now used on most automobiles.

It also comprehends a greatly simplified and improved set of gears suitable for automotive use.

It also comprehends the use of a damped dynamometer coupling as an element of the governing mechanism.

It also comprehends the use of dashpots as time delay mechanism as an element of the dynamometer coupling.

It also comprehends the use of a dynamic electric generator as an element of the speed responsive governor. In this governor the torque created by magnetic slip is balanced against a resilient member and this governor therefore operates as a "magnetic" or "magnetic slip" governor.

It also comprehends the use of a trip mechanism to make the governor action positive.

It also comprehends the use of relays controlled by the magnetic slip governor to make the governor action positive.

It also comprehends the use of resistance in combination with the governor, the relays and a plurality of contacts to make the governor action positive and to insure that the change from a higher to a lower speed occurs at different speed-torque condition than a change from the said lower speed to the said higher speed.

It also comprehends as an element of the governing mechanism a thermostatically controlled resistor for modifying the governor action in accordance with the temperature of the motor.

It also comprehends a manually operated control lever which like the standard gear-shift lever can be selectively placed in any one of four positions thus selectively engaging any one of three forward speeds and the reverse speed, and also can be selectively placed in any one of a plurality of automatic positions wherein the forward speeds are automatically engaged.

It also comprehends the addition of an extra position, wherein automatic control is engaged, to a conventionally manipulated nonautomatic change gear lever.

In the attached drawings which form a part of this application:

Figure 1 is a vertical longitudinal section of the entire machine, certain portions shown in elevation, certain portions shown as broken away and the electrical wiring removed.

Figure 2 is a section on the line 2—2 Figure 1 looking in the direction of the arrows.

Figure 3 is a section on the line 3—3 Figure 1 looking in the direction of the arrows.

Figure 4 shows as detached a portion of the clutch used as one of the component elements of my transmission.

Figure 5 shows as detached a portion of the brake used as one of the component elements of my transmission.

Figure 6 is a wiring diagram.

Figure 7 is the steering wheel of a motor vehicle and shows how the controller, one of the component elements of my machine, is applied thereto.

Figure 8 is a vertical longitudinal section of the controller shown in Figure 7.

Figure 9 is a horizontal longitudinal section of the controller shown in Figure 7.

Figure 10 is a vertical longitudinal section of the thermo-resistor, one of the component elements of my transmission.

Figure 11 is a vertical longitudinal section of the magnetic governor used as a component element of my machine. In this view some portions are shown in elevation and some portions are broken away.

Figure 12 is a section on the line 12—12 Figure 11 viewed in the direction of the arrows.

Figure 13 is a section on the line 13—13 Figure 11 viewed in the direction of the arrows.

Figure 14 is a section on the line 14—14 Figure 11 viewed in the direction of the arrows.

Figure 15 shows as detached the selector cylinder and the brush block, component elements of the magnetic governor shown in Figure 11.

Figure 16 is a section taken on line 16—16 Figure 21 taken in the direction of the arrows of another preferred governor which can be used as a component element of my invention and can be substituted for the governor shown in Figures 1, 6 and 11.

Figure 17 is the selector cylinder and brush block of the governor shown in Figure 16 shown as detached but in proper co-action relation.

Figure 18 is a section on the line 18—18 Figure 17 viewed in the direction of the arrows.

Figure 19 is a side view of a relay used as a component portion of the governor shown in Figure 16.

Figure 20 is a top view of the relay shown in Figure 19.

Figure 21 is a side view of the governor shown in section in Figure 16.

Figure 22 is a wiring diagram.

Figure 23 is a section on the line 23—23, Figure 16, viewed in the direction of the arrows.

Referring to the drawings wherein similar reference numerals denote similar parts:

1 represents my novel automatic transmission which has certain of its component portions encased and supported by the case 2 which is fastened to the flywheel housing 3 and is provided with the gear case 4; see Figure 1.

The flywheel 5 of the prime mover has fast thereto the dynamometer coupling housing 6 which carries the dashpot 7, the rheostat 8, the measuring springs 9, 9 and the slip ring 10; see Figures 1 and 2.

The housing 6 also has rotatively mounted therein the driving shaft 11 which has fast thereon the lever 12 which at one end engages with the double piston 13 of the dashpot 7 and at its opposite end loosely encircles the rod 14 which is fast in the lugs 15, 15 of the housing 6 and carries thereon the springs 9, 9. The lever 12 also carries and has electrically connected thereto the rheostat blade 16 which is electrically grounded since the lever 12 is grounded.

The slip ring 10 is carried on the hub 17 and is electrically connected to the center contact of the rheostat 8 by the lead 18. The hub 17 is made of insulating material, is fast to the housing 6 and is loosely fitted to the shaft 11. The base of the rheostat 8 is also made of insulating material and is fastened to the sidewall of the housing 6. The slip ring 10 is in contact with the brush 19 that is loosely mounted in the insulating tube 20. It is electrically connected with the screw 21 and is pressed against the slip ring 10 by the spring 22. The tube 20 is fast in the flywheel housing 3.

The driving shaft 11 is journaled in the flywheel housing 3, carries fast thereon the slip ring block 23, which is made of insulating material and carries the slip rings 24, 25 and 26. The shaft 11 terminates in the dual clutch element 27. Brush assemblies 28, 29 and 30 respectively co-act with slip rings 24, 25 and 26. These brushes are similar to the brush 19 and its adjuncts described. The dual clutch element 27, see Figures 1 and 4, is made of a magnetic material and carries magnet wire coils 31 and 32 in its grooves. The coil 31 has one end thereof connected to the slip ring 25 the other end being connected to slip ring 24. The coil 32 has one end thereof connected to the slip ring 26 the other end being connected to slip ring 24; see Figure 6. The clutch element 27 is suitably bushed at 33 and has journaled therein the inter-shaft 34 which has fast thereon the clutch plate 35 and the gear 36, is rotatively mounted in the driven shaft 37 and has rotatively mounted thereon the hub of the clutch plate 38. The clutch plates 35 and 38 are made of suitable magnetic material and co-act with the clutch element 27 singly or simultaneously when the coils 31 and 32 are suitably energized. The hub of the clutch plate 38 has fast thereto the gear 39. The driven shaft 37 has fast thereon the gear 40. The carrier housing 41 is made of magnetic material, is rotatively mounted on the hub of the clutch plate 38 and on the driven shaft 37 and has fast thereon planet shafts 42 which have rotatively mounted thereon triple gears 43; see Figures 1 and 3. These triple gears 43 mesh with and mechanically connect the gears 39, 36 and 40.

The brake 44, see Figures 1, 5 and 6, is fast to the case 2 and is provided with oppositely disposed grooves containing magnet coils 45 and 46. Coil 45 has one end thereof connected to the binding post 47, the other end being grounded. Coil 46 has one end thereof connected to the binding post 48, the other end being grounded.

The driven shaft 37 has fast thereto a spiral gear 49 and the final drive flange 50. It is suitably journaled in the case 2. The spiral gear 49 may be used as a portion of the speedometer drive. It also engages with the gear 51 of the governor 60 and therefore drives the governor in synchronism with driven shaft 37; see also Figure 11.

Referring to Figures 11 to 15 inclusive: The gear 51 is fast on the shaft 52 which is journaled in the case 53 and has fast thereon the cup 54 which has fast therein the "rotor" 55. This rotor 55 is constructed of a stack of laminations of magnetic material fastened together with rivets of a good conducting material, the top and bottom laminations being also of a good conducting material; see Figure 14. The field 56 is also composed of laminations of magnetic material shaped in the well known shuttle armature shape and provided with suitable magnetizing coils 61 terminating in the slip rings 57 and 58 which are mounted on the insulating sleeve 59.

The field 56 and the sleeve 59 are fast on the shaft 62 which is journaled in the support 63 and in the cap 64, has fast thereon the detent cup 65 and has loosely mounted thereon the selector cylinder 66. The slip rings 57 and 58 are engaged by brushes 67 and 68, of similar construction to the brush 19 aforedescribed. Brushes 69 to 73 inclusive engage with the selector cylinder 66, are mounted in a brush block 74 and may also be made similar to brush 19. The support 63 is fastened to the case 53 and has fastened thereto one end of a spiral spring 75 the other end of this spring being fastened to the detent cup 65 at 76. The detent cup 65 also carries the drive pin 77, that fits loosely into the slot 78 of the selector cylinder 66, and the stop pins 79—79 which, by pressing against the detent case 80, prevent excessive rotation of the stator 56 and adjuncts.

The detent case 80 contains slidably therein the detent 81 which is pressed against the detent cup 65 by the spring 82 which is supported by the screw 83. The detent cup 65 is provided with detent grooves 84. The selector cylinder 66 is provided with contact strips 85 to 90 inclusive all of which have detent depressions 91. The action of these detent portions will hereinafter be described.

The controller 92, see Figures 6, 7, 8 and 9, is preferably moulded from suitable insulating material in two portions, an upper part 93 and a lower part 94. The upper part 93 is made with an extended portion 91 that can be suitably fastened to the steering post of the motor vehicle, just below the steering wheel 95. It is also pierced with a suitably shaped hole to permit extension of the "shift" lever 96 and also to confine the "shift" lever to proper motions. The lower portion 94 has embedded therein suitable contacts and leads and a rheostat 97 for making electrical connections that will hereinafter be described. The said leads emerge at the cavity 98 wherein also terminates the cable 99 and thus forms a convenient splicing box. The portions 93 and 94 of the controller are fastened together by screws 100 and they freely support the ball 101 of the shift lever 96 which is provided at its lower end with a plurality of spring pressed brushes 102, thus insuring that all of the contacts in the group constituting a speed are simultaneously contacted.

The thermo-resistor 103, see Figures 6 and 10, has a base 104 made of a suitable insulating material and provided with binding post screws 105 and 106. The screw 105 holds one end of a resistance element 108, a spacer of conducting material 109 and supports the bi-metal strip 110. The screw 106 supports the other end of the resistance element 108, which is suitably formed to clear the bi-metal strip 110, and terminates in a contact 107 which co-acts with the contact 111 carried by the bi-metal strip. A cover 112 is also provided.

Referring to Figures 6, 8, 9, 11 and 15 it will be seen that the electrical connections are: The battery 113 has one terminal grounded by means of lead A1 the other terminal being connected by means of lead A2 to the shift lever 96 which can be manipulated so that it contacts either with the strips 114 and 115 and the rheostat 97 as when the lever 96 is in its "automatic" position (see Figures 6 and 9) or by putting it in one of the other four slots it will contact with one of the four pairs of contacts embedded in the controller base, or by leaving it in its neutral position (central) it makes no contact and there is no electrical circuit.

The contact strips 114 and 115 respectively are connected to the brushes 69 and 73 by means of leads A3 and A4. The rheostat 97 is electrically connected to the brush 68 by means of lead A5. The brush 67 is connected to the thermo-resistor 103 by means of lead A6. The other terminal of the thermo-resistor 103 is connected to the brush 19 which contacts with the slip ring 10 which is connected to the rheostat 8. This rheostat has its contact lever 16 grounded.

The contact 116 is connected by lead A7 to the binding post 47 which connects to one end of coil 45 the other end of this coil being grounded.

The three contacts 117 are connected by means of lead A8 to the brush 70 and to brush 29 which contacts slip ring 25 that is electrically connected to one end of coil 31, the other end of coil 31 being connected to slip ring 24 that is contacted by brush 28 that is connected by means of lead A9 to the "clutch pedal" 118.

This clutch pedal 118 is a circuit opening push button, that is, it breaks the electric circuit when depressed. It is mounted on the floor board 119 and electrically connected to the accelerator pedal 120. The pedal 120 in addition to acting as the fuel control also is a circuit making push button, that is, makes contact when depressed. It also is mounted on the floor board 119 and is connected to the ground by means of lead A10.

The switch 121 is a single pole switch and is mounted on the dashboard 122. It is connected across the accelerator pedal 120 by leads A11 and A12 and serves to cut out the free wheeling effect produced by accelerator pedal 120 when such effect is undesirable.

The two contacts 123 are connected by lead A13 to brush 72 and the binding post 48 which connects with one terminal of coil 46 the other end of this coil being grounded.

The two contacts 124 are connected by lead A14, to the brush 71 and the brush 30 which through the slip ring 26 connects to one end of coil 32 the other end of this coil being connected to the slip ring 24.

The internal connections of the selector cylinder 66 are such that contact strips 85 and 86 are connected together and contact strips 87 to 90 inclusive are connected together. The cylinder 66 is made of insulating material. The contact strips 85 to 90 inclusive are of metal and are fast to the cylinder 66.

The operation is as follows:

With the automobile engine running, the clutch pedal 118 in the position shown and the switch 121 closed, putting the lever 96 in the automatic slot, see Figure 6, will cause the car to begin forward motion and change speeds in an automatic manner as follows:

Current from the battery 113 flows to the lever 96 then to contact strips 114 and 115 then to brushes 69 and 73. The current from brush 69 flows through the strip 85 to the strip 86 on the selector cylinder 66 to the brush 70 then to the brush 29 then to slip ring 25 through coil 31 to slip ring 24 to brush 28 to clutch pedal 118 through switch 121 to ground. The current from brush 73 flows to the selector cylinder strip 90 to strip 89 to brush 72 to binding post 48 through coil 46 to ground; see Figures 6 and 15. Energizing coils 31 and 46 causes the clutch member 27 to engage with clutch plate 35 and brake 44 to hold carrier 41 from rotation. The prime mover now drives the driven shaft 37 at a reduced speed through the following mechanism: Rotating prime mover fly-wheel 5 carries housing 6 and through spring 9 drives lever 12 and driving shaft 11 which carries clutch 27 and therefore clutch plate 35, shaft 34 and gear 36. Gear 36 drives triple gear 43 which drives gear 40 and driven shaft 37 in the same direction as flywheel 5 but at a reduced speed depending on the relative diameters of the gears involved; see Figures 1, 2 and 3. This is the "low" speed.

With lever 96 in the automatic position, current from the battery 113, flowing from the lever 96 to the rheostat 97 then to brush 68 to slip ring 57 through coils 61 to slip ring 58 to brush 67 to thermo-resistor 103 to brush 19 to slip ring 10 to rheostat 8 to lever 16 to ground, energizes the field 56 of the governor 60 to an extent dependent on: A. The position of the lever 96 determining the amount of resistance of rheostat 97 in the circuit. This is under the operator's control. B. The resistance inserted or cut out by the thermo-resistor 103. This is determined by the temperature of the engine. When the engine is cold the thermo-resistor is as shown in Figure 10, with its contacts 107 and 111 apart and current flowing therethrough must travel through the resistance 108. When the motor warms up the bi-metal strip 110 deflects forcing the contacts 111 and 107 together and cutting out the resistance 108. The thermo-ré- sistor may be mounted either in the motor oil or in the motor cooling system or in any other location properly affected by the motor heat.

C. The position of the lever 16 on the rheostat 8. This is determined by the intensity of the torque exerted by the prime mover in turning the transmission and its load, the more load the greater the deflection of the spring and the more resistance inserted in the circuit by moved lever 16. Sudden changes of torque are prevented from causing corresponding sudden changes in resistance by the damping action of the dashpot 7. When the direction of torque is reversed, as when the motor is used as a brake in descending hills, the deflection caused by this reverse torque also inserts resistance in the circuit. This, as will hereinafter be more fully explained, causes a change from the higher to the lower ratio gears; see Figures 2 and 6.

When the driven shaft 37 is rotating in a forward direction the gear 49 causes the gear 51 to be revolved in the direction of the arrow "B" thus turning the rotor 55 in the same direction. The field 56 tends to follow the rotor but is restrained by the combined action of the return spring 75 and the detent 81. The effort with which the field 56 tends to follow the rotor 55 is dependent on: The speed of the rotor, turning effort is directly proportionate to the speed; The intensity of the current flowing through the field. This current strength depends on the motor temperature due to the thermo-resistor, the torque transmitted due to the dynamometer coupling, and the requirements of the operator, due to the rheostat 97.

When conditions are correct for a change in speed the field 56 will develop sufficient turning effort to overcome the combined action of both the detent 81 and the return spring 75 and cause angular displacement of the selector cylinder 90 degrees at which position the next detent groove 84 is engaged. The described loose connection, caused by the clearance of the pin 77 in the slot 78 combined with the detent action of the brushes 69 to 73 inclusive with the depressions 91 in the contact strips also helps make positive the action of the selector cylinder 66 and with the detent 81 prevents "hunting."

When the selector cylinder has turned to its second position hereinabove described contact strips 85 and 86 are no longer under their brushes. Coil 31 is de-energized. Contact strip 88 is contacting with brush 71 which electrically connects brush 71, brush 30 and coil 32 with the feed brush 73 and energizes coil 32. Brush 72 still contacts and coil 46 is energized. With coils 32 and 46 now energized the clutch element 27 engages with clutch plate 38 and the brake 44 holds the carrier 41 from revolving. The drive now is from the fly-wheel 5 through the coupling 6, the shaft 11, the clutch member 27, the clutch plate 38, the gear 39, the triple gears 43, the gear 40 to the driven shaft 37, in the same direction as the fly-wheel 5 and at a reduced speed dependent on the relative diameters of the gears involved. This is the second or intermediate forward speed.

Further increase in speed or increase in current flowing in the coil 61 will cause increased turning effort of the field 56 to cause it to turn the selector cylinder another 90 degrees and cause strip 89 to break contact with the brush 72 and will cause the strip 87 to contact with the brush 70. Both coils 31 and 32 of the clutch 27 are now energized and both clutch plates 35 and 38 are engaged. This locks the entire triple gear and carrier assembly, causing it to rotate as a unit and to transmit power from the fly-wheel 5 to the driven shaft 37 at the same speed. None of the brake action is now employed. This is the high or direct drive.

When the speed of the driven shaft 37 is sufficiently reduced, or when the torsion increases, or when a sufficient combination of reduced speed and increased torque occurs the return spring 75 will cause the selector 66 and its adjuncts to turn in the opposite direction thus successively re-engaging the lower speeds.

When the car is descending a hill and the motor is used as a brake the reverse torque, due to action of the coupling 6 and its rheostat 8, causes the weakening of the current in the coils 61 and therefore effects the automatic reengagement of the lower speeds.

When travel in a reverse direction is required the operator can secure same by moving the lever 96 to the reverse slot. The automatic speed changing mechanism is disconnected and the selector cylinder 66 assumes the position shown; see Figure 15. The lever 96 now contacts only with contact 116 and one of contacts 117. This causes coils 45 and 31 to be energized. The drive now is: from fly-wheel 5 through coupling 6, shaft 11, clutch element 27 to clutch plate 35 to shaft 34 to gear 36 to triple gear 43. Since coil 45 causes the brake 44 to hold plate 38 and therefore gear 39 from turning the triple gear 43 rolls backward over the gear 39 and carries the carrier 41, the gear 40 and therefore the driven shaft 37 in a reverse direction.

The operator can also manually engage the forward speeds in a manner wherein no automatic action occurs. Putting the lever 96 in the "low" slot causes it to contact only one each of contacts 117 and 123 energizing coils 31 and 46 causing the low speed as has been described.

Placing lever 96 in the second speed slot causes it to contact with one each of contacts 123 and 124 energizing coils 32 and 46 and thus causing second speed as has been described.

Placing lever 96 in the high position causes it to only contact with one each of contacts 117 and 124 and by energizing coils 31 and 32 causing high speed.

It is to be noted that the manual operation of these speeds is arranged in a manner familiar to drivers of the present day vehicles and that the clutch button operates to produce neutral in the conventional manner.

The action of the accelerator switch 120 in conjunction with the switch 121 provides a free wheeling that can be instantly connected or disconnected.

Figures 16 to 23 inclusive show another preferred type of governor. In these figures portions similar to portions already hereinabove described have assigned thereto similar numerals followed by the letter B and other portions not similar to described portions have assigned thereto numerals 125 or larger.

Referring to the drawings, Figures 16 to 23 inclusive, 60B is another preferred type of governor having certain of its component portions encased in a case 53B wherein is rotatively mounted the shaft 52B that has fast thereon the gear 51B and the cup 54B. The cup 54B carries the rotor 55B. The case 53B also has fast thereto the support 125 that is provided with a rim 126 and a tubular portion 127. This tubular portion 127 is apertured at 128, carries the antifriction bearings 129, 129 and the spring case 130 wherein is contained the spring 75B. The antifriction bearings 129, 129 carry the shaft 62B that has fastened thereto one end of the said spring 75B the other end thereof being fast to the said case 130 that is fast on the portion 127, the said spring 75B being under initial tension that it tends to rotate the shaft 62B in a clockwise direction when viewed from above. The shaft 62B has fast thereon the field 56B and the selector cylinder 66B. It also is slotted so as to provide wireways for leads 131, 132 from the winding 61B. These leads 131, 132 are connected respectively to the slip rings 57B and 58B. The selector cylinder 66B also carries contacts 133 and 134, and a resistance 135 one end thereof being connected to the contact 133 the other end being connected to the contact 134. The contact 133 is grounded by being connected to the shaft 62B. The brush block 74B is fast to the support 125 and carries the brushes 67B, 68B, 136 and 137. The brushes 67B and 68B respectively contact the slip rings 58B and 57B. The brushes 136 and 137 co-act with the contacts 133 and 134. The brush 136 is connected to the relay 138. The brush 137 is connected to the relay 139. These relays 138 and 139 being of identical structure only relay 138 will be hereinafter described. The field 56B has fast thereto a stop pin 140 that co-acts with the stop plate 141 that is fastened at 142 to the support 125 which also has fastened thereto at 143 the terminal board 144. A cover 145 is provided and fits tightly on the rim 126 that is apertured at 146 to provide for leads A15 to A21 inclusive being connected to their respective screws on the terminal board 144.

The relay 138, see Figures 19 and 20, is mounted on an insulating base 147 that can be fastened by means of screws 148, 148 to the support 125. It has a magnet coil 148 wound on a tubular steel core 149 and is provided with steel pole pieces 150 and 151. The base 147, the coil 148 with its core 149, the pole pieces 150 and 151 and a resilient member 152 are all fastened in position by a screw 153 that fits into a tapped hole in the pole piece 150 that also has screwed thereto by screws 154 the insulating block 155. This block carries the contact screw 156 and has fastened thereto by screws 157 the contact bracket 158. The structure is such that both the contact bracket 158 and the contact screw 156 are electrically insulated both from each other and from all other portions of the relay except the contact 159 that is carried by the resilient member 152 that also has fast thereto the steel armature 160. The contact 159 is adapted to contact either with the contact 156 or the contact 158. When the coil 148 is sufficiently energized the armature 160 is attracted and contacts 159 and 156 co-act. When the coil 148 is not energized the resilient member 152 causes the parts to be as shown in Figure 19 wherein the contacts 159 and 158 co-act. The coil 148 and the resistance 135 are so proportioned that when current from the battery 113 flows through coil 148 in series with resistance 135, and the relay 138 is in the open position as shown in Figure 19, the coil 148 is not sufficiently energized to effect a change and the magnetic portions stay in the position shown. When current from the battery travels through the coil 148 only, the relay is sufficiently energized to close (attract its armature). When the relay is in its closed position and the resistance 135 is inserted into the circuit so that current flowing through coil 148 also flows through resistance 135 the relay is still sufficiently energized to stay closed. When the circuit is broken and no current flows through coil 148 the relay opens and is as shown in Figure 19.

This described governor 60B may be substituted for the governor 60, the electrical connections being shown in diagram Figure 22. Leads A3, A8, A14, A13, A4, A5 and A6 are the leads shown in diagram Figure 6. The other wiring in Figure 22 is internal wiring of the governor. Referring to Figure 22, A15 is a lead connecting terminal board screw connected to external lead A3 with the resilient member 152 of relay 139. A16 connects terminal having connected thereto lead A8 with the contact screw 156 of the relay 139 and the contact bracket of the relay 138. A17 connects the terminal having connected thereto lead A14 with the contact screw of the relay 138. A18 connects the terminal having connected thereto lead A13 with the contact bracket 158 of the relay 139. A19 connects the terminal having connected thereto lead A4 with the resilient member of the relay 138 and one end of the coil 148 of the relay 138 and one end of the coil 148 of the relay 139. A20 connects the brush 68B with the terminal having connected thereto lead A5. A21 connects the brush 67B with the terminal having connected thereto lead A6. A22 connects the one end of coil 148 of relay 138 with the brush 136. A23 connects one end of the coil of the relay 139 with the brush 137.

When this governor 60B is substituted for the governor 60, the leads A3, A8, A14, A13, A4, A5 and A6 being connected as indicated in Figure 22, and the controller lever 96 put in automatic position, it will operate as follows: Current from the battery 113 flows by way of lead A2 to lever 96 to rheostat 97 to lead A5 to terminal board 144 to lead A20 to brush 68B to slip ring 57B to lead 131 to winding 61B to lead 132 to slip ring 58B to brush 67B to lead A21 to lead A6 to the thermo-resistor 103 to brush 19 to slip ring 10 to rheostat 8, contact lever 16 to ground and back to the battery 113 thus energizing coil 61B to an extent dependent on the settings of the rheostats 8 and 97 and on the position of thermo-resistor 103. Driving the gear 51B (in the direction of the arrow B, Figure 11) will cause the field 56B to tend to follow against the pull of the spring 75B and to assume a position wherein its turning effort balances the reverse effort of the spring 75B. The resultant angular displacement of the field 56B and its adjuncts is determined by the speed of the rotor 55B and by the intensity of the magnetism of the field 56B. It has already been described how the combined action of the rheostats 8 and 97 and the thermo-resistor 103 modify the magnetic intensity of the field 56B.

Angular displacement of the field 56B causes like angular displacement of the selector cylinder 66B and causes an automatic selection of gear ratios as follows: When there is little or no angular displacement the brushes 136 and 137 do not contact with contacts 133 or 134 thus the coils of relays 138 and 139 are not energized and the relay contact portions are as shown in Figure 22. Current from the battery flowing by way of lead A2 to lever 96, contacts 114 and 115, leads A3 and A4, leads A15 and A19, leads A18 and A16 and leads A13 and A8 energizes clutch coil 31 and brake coil 46 and produces, as has been described, the low speed.

Angular displacement of selector cylinder 66B sufficient to cause brush 136 to contact with strip 133 will cause the relay 138 to attract its armature and to de-energize lead A16 and thus lead A8, and to energize lead A17 and thus lead A14. This will cause de-energization of the coil 31 and energization of the coil 32 and thus, as has been described, cause second speed to be engaged.

Further angular displacement of the selector cylinder 66B will cause the brush 137 to contact with contact 133 and relay 139 will attract its armature de-energizing leads A18 and A13 and thus coil 46, and energizing leads A16 and A8 and thus, as has been described, causing the high or direct speed to be engaged.

When automatic selection to the lower speeds is effected the above described actions take place in the following order: Contact 134 is disconnected from brush 137 and relay 139 releases its armature causing second speed to be engaged. Contact 134 is disconnected from brush 136 and relay 138 releases its armature and low speed is engaged.

When one of the relays is to attract its armature it is necessary for its respective brush 136 or 137 to contact with the contact 133 but when it is to release its armature it is necessary, due to the action of the resistor 135, for its respective brush not only to leave contact 133 but also to leave contact 134. It is therefore seen that there can be a predetermined amount of angular displacement of the selector cylinder 66B wherein no change of gear ratio takes place. This effect is highly desirable and produces the following advantage: it allows the governor to hunt without causing like undesirable changes in gear ratio; it enables predetermination of the difference in speeds of the shift into or out of any one of the gear ratios.

Having described my invention in detail it will now be apparent to persons skilled in this art that the essentials of this invention are the combination of suitable shafts and gears with means of synchronizing and coupling these gears in different combinations, the synchronizing coupling mechanism being either manually controlled by the operator or being automatically controlled by the described governor. This governor being different from other governors used in this art in that its governing effort is directly proportionate to the speed and therefore is readily controllable as by inserting resistance in its field circuit. A dynamometer coupling, by measuring the torque transmitted and inserting appropriate resistance in the governor circuit, modifies its action and makes it not only directly proportionate to the speed but also inversely proportionate to the torque. The readily controllable feature of this governor is also taken advantage of by using the thermo-resistor and by using the manually controlled rheostat. It also makes readily possible the reverse torque control feature.

The hereinabove described transmission is only one of many possible embodiments of my invention which is not limited to the structure and arrangement hereinabove described. Since this invention is not limited to usage in conjunction with gasoline automobiles its structure and arrangement will vary in accordance with the requirements of particular applications.

In some applications the hereinabove described type of governor using relays can be advantageously used. When additional speeds are herein required more relays can be added. When stronger electrical currents need be handled the relays can be modified to be contactors or can be connected to control contactors.

All of the hereinabove described variations and some other variations can be made in this invention without departing from the spirit thereof or sacrificing any of its advantages and therefore it is apparent that the appended claims be limited in their scope only by the prior art.

I claim:

1. A transmission comprising driving and driven members; a plurality of trains of transmission gears for operatively connecting said driving and driven members at any one of a plurality of gear ratios; and an electrical governor for selectively engaging any one of said trains of gears with said driving and driven members, said electrical governor comprising a damped dynamometer coupling operatively connected to said driving member, a dashpot operatively connected to said damped dynamometer coupling, a speed responsive member operatively connected to said driven member, and means electrically connecting said dynamometer coupling with said speed responsive member.

2. A transmission comprising driving and driven members; a plurality of trains of transmission gears for operatively connecting said driving and driven members at any one of a plurality of gear ratios; and means for selectively engaging any one of said trains of gears with said driving and driven members, said means comprising a damped dynamometer coupling operatively connected to said driving member, a magnetic slip governor operatively connected to said driven member, and means electrically connecting said damped dynamometer coupling with said slip governor.

3. A transmission comprising driving and driven members; a plurality of trains of transmission gears for operatively connecting said driving and driven members at any one of a plurality of gear ratios; means for selectively engaging any one of said trains of gears with said driving and driven members, said means comprising a torque responsive means operatively connected to said driving member, a speed responsive means operatively connected to said driven member, and means electrically connecting said torque responsive means with said speed responsive means; and a manually operated gear shift lever adapted to be moved to any one of a plurality of positions, electrically connected to said means electrically connecting said torque responsive means with said speed responsive means.

4. A transmission comprising driving and driven members; a plurality of trains of transmission gears for operatively connecting said driving and driven members at any one of a plurality of gear ratios; means for selectively engaging any one of said trains of gears with said driving and driven members, said means comprising a damped dynamometer coupling operatively connected to said driving member, a magnetic slip governor operatively connected to said driven member, and means electrically connecting said dynamometer coupling with said slip governor; and a manually operated gear shift lever adapted to be moved to any one of a plurality of positions electrically connected to said means electrically connecting said dynamometer coupling with said slip governor.

5. A transmission comprising driving and driven members; a plurality of trains of transmission gears for operatively connecting said driving and driven members at any one of a plurality of gear ratios; means for selectively engaging any one of said trains of gears with said driving and driven members, said means comprising torque responsive means operatively connected to said driving member, speed responsive means operatively connected to said driven member, and means electrically connecting said torque responsive means with said speed responsive means; and a manually operated gear shift lever adapted to be moved to any one of five positions, four of which are the positions assumed by the standard gear shift levers now in use on automobiles, electrically connected to said means electrically connecting said torque responsive means with said speed responsive means.

6. An automatic transmission comprising driving and driven members; a plurality of trains of transmission gears for operatively connecting said driving and driven members at any one of a plurality of gear ratios; an electrical governor operatively connected to said driving and driven members for selectively engaging any one of said trains of gears with said driving and driven members; and means responsive to the temperature of said driving member operatively connected to and controlling said electrical governor.

7. An automatic transmission comprising driving and driven members; a plurality of trains of transmission gears for operatively connecting said driving and driven members at any one of a plurality of gear ratios; an electrical governor operatively connected to said driving and driven members for selectively engaging any one of said trains of gears with said driving and driven members; and means responsive to the temperature of said driving member operatively connected to and controlling said electrical governor, said temperature responsive means comprising two spaced apart elements of electrical conducting material, an electrical resistance element connecting said two spaced apart electrical conducting elements, and a strip of thermally responsive electrical conducting material positioned in parallel with said electrical resistance element, connected to one of said spaced apart elements, not connected to the other of said spaced apart elements under certain temperature conditions, and positioned for connecting with said other spaced apart element under other temperature conditions.

8. A transmission comprising driving and driven members; a plurality of trains of transmission gears for operatively connecting said driving and driven members at any one of a plurality of gear ratios; an electrical governor for selectively engaging any one of said trains of gears with said driving and driven members, said electrical governor comprising a torque responsive member operatively connected to said driving member, a speed responsive member operatively connected to said driven member, and means electrically connecting said torque and speed responsive members, said speed responsive member comprising a selector portion, contacts carried by said selector portion, a relay mechanism, second contacts co-acting with the first mentioned contacts and controlling said relay mechanism, resistance electrically connected to some of said contacts and cooperating therewith to permit hunting of the selector portion without causing action of the relay mechanism, and means electrically connecting said relay mechanism with said means electrically connecting said torque and speed responsive members.

9. A transmission comprising driving and driven members and a carrier mounted in alignment; a driven gear fixed to said driven member; a driving sun gear loosely mounted in alignment with said driving and driven members and being of less diameter than said driven gear; a second driving sun gear loosely mounted in alignment with said driving and driven members and being of lesser diameter than said driven gear and first driving sun gear; coupling means for making said first driving sun gear fast to said driving member; coupling means for making said second driving sun gear fast to said driving member; coupling means for holding said carrier from rotating; coupling means for holding said first driving sun gear from rotating; transmission gears carried by said carrier and operatively connecting said first driving sun gear and said second driving sun gear to said driven gear; and an electric governor controlling some of said coupling means, said governor comprising a torque responsive member operatively connected to said driving member, a speed responsive member operatively connected to said driven member, and electrical means operatively connected to said torque responsive member and said speed responsive member.

10. A transmission comprising driving and driven members and a carrier mounted in alignment; a driven gear fixed to said driven member; a driving sun gear loosely mounted in alignment with said driving and driven members and being of less diameter than said driven gear; a second driving sun gear loosely mounted in alignment with said driving and driven members and being of lesser diameter than said driven gear and first driving sun gear; coupling means for making said first driving sun gear fast to said driving member; coupling means for making said second driving sun gear fast to said driving member; coupling means for holding said carrier from rotating; coupling means for holding said first driving sun gear from rotating; transmission gears carried by said carrier and operatively connecting said first driving sun gear and said second driving sun gear with said driven gear; and an electric governor controlling some of said coupling means, said governor comprising a torque responsive member operatively connected to said driving member, a speed responsive member operatively connected to said driven member, electrical means including an element responsive to the heat of said driving member operatively connected to said torque responsive member and said speed responsive member.

11. A transmission comprising driving and driven members mounted in alignment; a shaft positioned between said driving and driven members and journalled at one of its ends in said driving member and at the other of its ends in said driven member; a clutch element mounted on said shaft and attached to said shaft for rotation therewith; a second clutch element loosely mounted on said shaft; a carrier loosely mounted on said second clutch element and said driven member; a driven gear fixed to said driven member; a driving sun gear of less diameter than said driven gear mounted on said second clutch element and attached to said second clutch element for rotation therewith; a second driving sun gear of lesser diameter than said driven gear and first driving sun gear attached to said shaft for rotation therewith; transmission gears carried by said carrier and operatively connecting with said first driving sun gear, said second driving sun gear, and said driven gear; coupling means for making said first clutch element fast to said driving member; coupling means for making said second clutch element fast to said driving member; coupling means for holding said carrier from rotating; and an electric governor controlling some of said coupling means, said governor comprising a torque responsive member operatively connected to said driving member, a speed responsive member operatively connected to said driven member, and electrical means operatively connected to said torque responsive member and said speed responsive member.

12. A transmission comprising driving and driven members mounted in alignment; a shaft positioned between said driving and driven members and journalled at one of its ends in said driving member and at the other of its ends in said driven member; a clutch element mounted on said shaft and attached to said shaft for rotation therewith; a second clutch element loosely mounted on said shaft; a carrier loosely mounted on said second clutch element and said driven member; a driven gear fixed to said driven member; a driving sun gear of less diameter than said driven gear mounted on said second clutch element and attached to said second clutch element for rotation therewith; a second driving sun gear of lesser diameter than said driven gear and first driving sun gear attached to said shaft for rotation therewith; transmission gears carried by said carrier and operatively connecting with said first driving sun gear, said second driving sun gear, and said driven gear; coupling means for making said first clutch element fast to said driving member; coupling means for making said second clutch element fast to said driving member; coupling means for holding said carrier from rotating; and an electric governor controlling some of said coupling means, said governor comprising a torque responsive member operatively connected to said driving member, a speed responsive member operatively connected to said driven member, electrical means including an element responsive to the heat of said driving member operatively connected to said torque responsive member and said speed responsive member.

MATTHEW STUCATUR.